United States Patent [19]

Falchi

[11] Patent Number: 4,702,711

[45] Date of Patent: Oct. 27, 1987

[54] SNAP-ACTION BAYONET-TYPE FASTENING DEVICE FOR CONTROL AND/OR SIGNALLING UNITS

[75] Inventor: Fiorino Falchi, Sangano, Italy

[73] Assignee: General Electric Company, Charlottesville, Va.

[21] Appl. No.: 855,948

[22] Filed: Apr. 25, 1986

[30] Foreign Application Priority Data

Apr. 24, 1985 [IT]  Italy ............................. 21636/85[U]

[51] Int. Cl.⁴ ........................................... H01R 13/74
[52] U.S. Cl. ................................... 439/546; 248/27.1
[58] Field of Search ...................... 339/127 R, 127 C; 248/27.1, 27.3

[56] References Cited

U.S. PATENT DOCUMENTS

| 979,927 | 12/1910 | Brown et al. ................... 339/127 R |
| 3,655,154 | 4/1972 | Orts .................................... 248/27.1 |
| 4,586,843 | 5/1986 | Heng et al. .................... 248/27.1 X |

FOREIGN PATENT DOCUMENTS 2322441  2/1977  France ............................... 248/27.1

Primary Examiner—Eugene F. Desmond
Attorney, Agent, or Firm—James H. Beusse; Irving M. Freedman

[57] ABSTRACT

A snap-action bayonet-type fastening device for control and/or signalling units comprises an annular element placed between the operative unit and said control and/or signalling unit having the form of a coupling ferrule comprising a cornice with protuberances designed to engage with appropriate fixing means present on said operative unit and two or more flexible appendices with slots and/or teeth designed to engage with corresponding protuberances or indentations made in said control and/or signalling unit.

4 Claims, 4 Drawing Figures

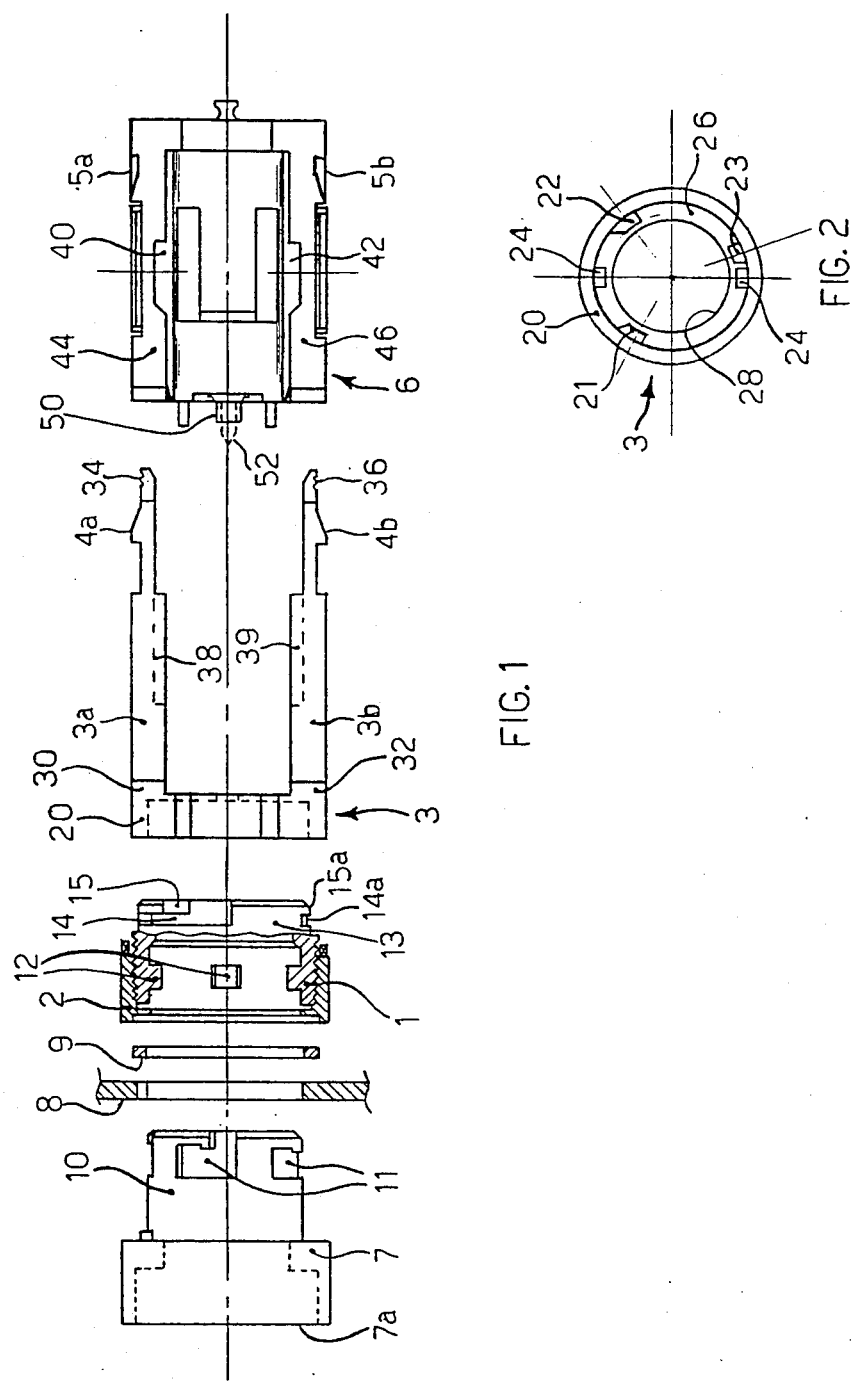

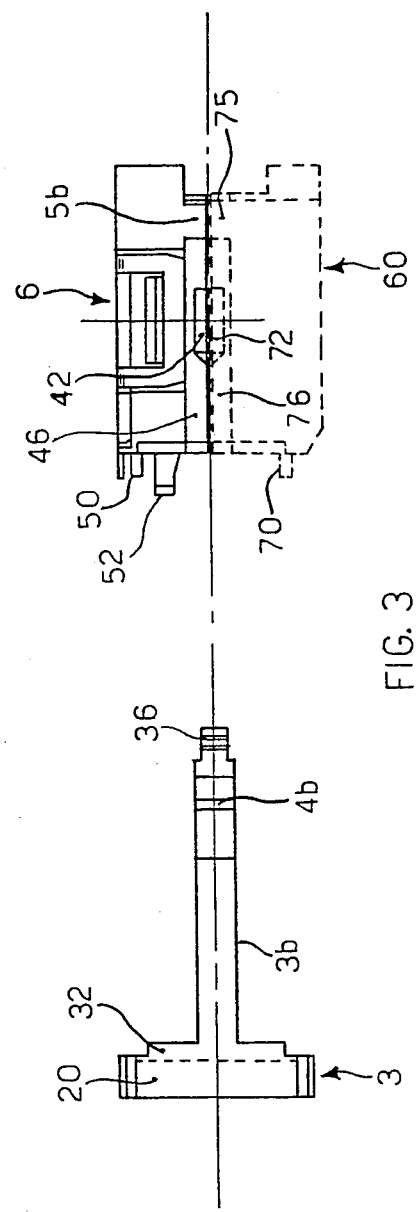
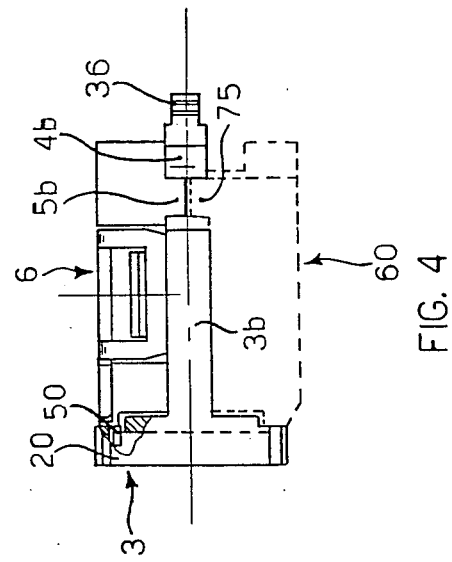
FIG. 3
FIG. 4

SNAP-ACTION BAYONET-TYPE FASTENING DEVICE FOR CONTROL AND/OR SIGNALLING UNITS

Applicant claims the benefit of the filing date of Italian application No. 21636B/85 for which this application is a translation.

The present invention relates to a snap-action bayonet-type fastening device for control and/or signalling units of which the form and arrangement of the parts give it particularly useful characteristics.

Among known systems for fastening control and/or signalling units such as switches, commutators and warning or signalling lights to a panel those in most common use consist of fixing the operating part of the control unit to the panel by means of a threaded ring-nut. The threaded ring-nut is screwed onto the front of the operating part which has been previously inserted in a seat provided therefor in the panel in such a manner as to fix it firmly to said panel.

Another system in common use for fastening a control unit on a panel calls for the use of fixing screws and shimming which act between the panel and the body of the control unit which is housed in a seat provided therefor in said panel.

Both of these systems have considerable drawbacks. For example, the former type of connection does not prevent intentional or accidental unscrewing of the threaded ring-nut from the outside of the panel causing deactivation of the control unit. The design using screws and shimming has the drawback of making centering of the control unit on the panel particularly laborious and difficult.

To overcome these drawbacks Italian utility-model patent application No. 21111-B80 Fiorino Falchi, proposed the use of a control unit with a bayonet-type fastening assembly secured by a threaded ring-nut. Said fastening assembly consists essentially of an operative unit provided at the rear with a shaped portion insertable like a bayonet in a threaded sleeve fitted with a ring-nut which is the intermediate element connecting the operative unit to the panel by means of the ring-nut and fixing the receptacles or electrical units to the operative unit by means of appropriate securing devices provided and incorporated in the aforesaid sleeve. The control unit is secured to the panel or instrument using an appropriate tool which acts on the ring-nut of the threaded sleeve.

The fixing system described in the aforementioned Italian utility-model patent application has been improved in the manner described in the published European Patent Application 0,705,387, Fiorino Falchi, filed on Sept. 16, 1983 and to which reference is made by placing between the aforementioned threaded sleeve fitted with a ring-nut and the receptacles or electrical units an annular element designed to engage with a snap retainers formed on said sleeve and fitted with means for securing said receptacle in a releasable manner. In particular said anular element is formed of a cornice having a shape corresponding to that of the sleeve within which is mounted in a sliding manner on the plane of said cornice a guillotine element shaped to engage with a snap with said means of retention of the sleeve.

Said improvement functions very well but has the drawback of complexity and cost which justify its use only with electrical units of high cost and performance.

The present invention proposes a simpler and more economical annular element placed between said sleeve and the receptacles or electrical units and having the form of a bayonet-type coupling ferrule consisting of an annular cornice fitted with protuberances turned inward and designed to engage with appropriate securing means present in said sleeve and two or more flexible appendices fitted with slots and/or teeth designed to engage with corresponding protuberances and/or slots made in the receptacles or electrical units.

Said coupling ferrule also includes an annular flange turned inward and positioned on the side opposite the engagement side of said sleeve, within which are made openings designed to receive appendices protruding from said receptacles or electrical units to engage with corresponding slots made in said sleeve for the purpose of preventing any undue rotation of said coupling ferrule when at least one receptacle or electrical unit is inserted in the flexible appendices of same.

According to the invention the flange of the coupling ferrule has reinforcements at the base of said flexible appendices to limit bending of said appendices at their ends furthest from the cornice.

Said flexible appendices also include a first reinforced part closer to the cornice and having slots designed to receive corresponding protuberances on the sides of said receptacles or electrical units and a second part which is weakened and further from the cornice formed by a first thinning followed by a step forming a tooth which is in turn followed by an inclined plane and by a second thinning to allow engagement of the side protuberances present on said receptacles or electrical units for the purpose of allowing their subsequent locking once they have been inserted in said flexible appendices where said succession of a first thinning followed by a step, by an inclined plane and by a second thinning also allows release of said receptacles or electrical unit by mere bending inward of said second thinning.

These and other characteristics appear from the description below which is given with reference to the annexed figures containing drawings which illustrate a preferred embodiment of the fastening device reported for the sole purpose of exemplifying but not limiting the present invention.

With reference to the drawings:

FIG. 1 shows an exploded partially sectional side view of the control unit equipped with the fastening device according to the invention;

FIG. 2 shows a front view of the fastening ferrule of FIG. 1;

FIG. 3 shows a second exploded side view prependicular to the view shown in FIG. 2 of the assembled fastening ferrule and electrical unit; and FIG. 4 shows in the same side view of FIG. 3 the assembled fastening ferrule and electrical unit mounted together to make clear the action of the securing arrangements in effect between them.

With reference to the aforementioned figures of present control unit comprises a snap-action bayonet-type fastening device for control and/or signalling units consisting of a sleeve 1 having a partially threaded external surface, a threaded ring-nut 2 which can be screwed onto the external threaded surface of the sleeve 1 and an anular element or engagement ferrule 3 having flexible appendices 3a and 3b which have in turn teeth 4a and 4b designed to engage with corresponding side protuberances 5a and 5b present in the body of the electrical unit 6. An operative unit 7 secured to a panel 8 by means of said fastening device 1 and a washer 9 is also a part of the control unit.

The operative unit 7 within which is mounted a movable pressbutton 7a indicated by broken lines in FIG. 1 has a projecting rear portion which interacts with said fastening device and can be inserted like a bayonet and in a conventional manner in a hole of suitable form in the panel 8 and then in the sleeve 10 of the fastening device. Advantageously the external surface of a projecting portion 10 of the operative unit 7 has L-shaped cuts or serrations 11 which engage by sliding with appropriate projections 12 which are integral with the internal surface of the sleeve 1 where the relative rotation of the operative unit 7 with the portion 10 engaged like a bayonet in the sleeve 1 causes sliding of the projections 12 in the cuts 11 resulting in mutual engagement of the parts. The structure and operation of the operative unit 7 of the sleeve 1 are explained better and more fully in the aforementioned European Patent Application 0,105,387, Fiorino Falchi, to which reference is made.

According to the improvements of the present invention the coupling between the operative unit 7 and the electrical unit 6 is accomplished by means of a coupling ferrule 3 which consists essentially of a frame or anular cornice 20 which has a shape substantially corresponding to that of an unthreaded rear portion 13 of the sleeve 1 on which said anular cornice 20 can slide axially. The unthreaded rear portion 13 has slots arranged like arcs of a circle, like the slots 14 and 14a, and protrusions, like the protrusions 15 and 15a, designed to receive and engage the corresponding protuberances 21, 22 and 23 respectively which are designed to fit into the slots, like the slots 14 and 14a of the unthreaded portion of the sleeve, and to rotate into said protrusions 15 and 15a. There will be a third slot and a third protrusion now shown to engage the third of the protuberances 21, 22 and 23.

Said cornice 20 is then completed by an annular flange 26 which is disposed inwardly and which describes a central hole 28 the purpose of which is to lighten said ferrule.

The two appendices 3a and 3b have base reinforcements 30 and 32 respectively whose purpose is to aid the lengthwise flexibility of said appendices and also extend in two tongues 34 and 36 which can be acted upon to free the electrical unit 6 from the appendices 3a and 3b respectively. To better understand the operation of said coupling between the operative unit 7 and the electrical unit 6 it is pointed out that said flexible appendices 3a and 3b have longitudinal slots 38 and 39 which are designed to receive the two protuberances 40 and 42 respectively in the two longitudinal side indentations 44 and 46 of said electrical unit 6.

To complete the description it is noted that each electrical unit 6 has an appendix 50 protruding frontward from its case to engage through one of the rectangular openings 24 of the ferrule 3 with a corresponding longitudinal slot not shown present in the unthreaded portion 13 of the sleeve 1 to prevent rotation of the ferrule 3 with respect to the sleeve 1 after installation of the electrical unit 6.

If the electrical unit 6 is a control unit it must also have a rod 52 designed to transmit a movement produced by the pushbutton 7a which is contained in operative unit 7 to movable elements of said electrical unit.

Together with and opposed to the electrical unit can be installed another equal or different electrical unit having control and/or signalling functions. For example the electrical unit 60 indicated with dashed lines in FIGS. 3 and 4 may be a signalling unit to feed an optional lamp housed within the pushbutton 7a. Said unit 60 is generally shaped in a manner similar to that of the unit 6 and in particular has an appendix 70 in all ways like the appendix 50 of the unit 6 designed to fit through another rectangular opening 24 of the ferrule 3 into a corresponding longitudinal slot of the sleeve 1 for the purpose of helping to prevent rotation of the ferrule 3 with respect to the sleeve 1 after installation of the electrical unit 60. Said unit 60 also has a side protuberance 75 like the protuberance 5b capable of engaging with the tooth 4b of the appendix 3b and a protuberance 72 in a side indentation 76 having a longitudinal direction and being designed to engage the slot 39 of the appendix 3b (FIG. 1) to ensure fastening of the unit 60 to the ferrule 3.

Variations and modifications can of course be made in the invention described above without exceeding the scope of same.

I claim:

1. Snap-action bayonet-type fastening device for control and/or signalling units comprising a sleeve of a form corresponding to and designed to interact with a rear projecting portion of an operative unit which has shaped surface cuts, said sleeve having a form complementary to that of said rear portion of the operative unit inserted like a bayonet in said sleeve, the internal surface of said sleeve being provided with protrusions forming part of said bayonet coupling, the external surface of said sleeve being partially threaded; a ring-nut screwed onto the external surface of said sleeve; and means of fastening receptacles or electrical units of the control and/or signalling unit to said sleeve characterized in that said fastening means consist of an annular element positioned between said sleeve and said receptacles or electrical units, having the form of a ferrule comprising an annular cornice with protuberances turned inward and designed to engage with appropriate corresponding fixing means present on said sleeve and two or more flexible appendices having means designed for engaging with corresponding means in said receptacles or electrical units.

2. Fastening device according to claim 1 characterized in that said coupling ferrule comprises an annular flange turned inward and positioned on said side opposite that of engagement in said sleeve within which are made openings designed to receive appendices protruding from said receptacles or electrical units to engage with corresponding slots made in said sleeve to prevent any undue rotation of said coupling ferrule when at least one receptacle or electrical unit is inserted in the flexible appendices of said ferrule.

3. Fastening device according to claim 2 characterized in that the flange of the coupling ferrule has reinforcements at the bases of said flexible appendices to limit bending of said appendices in their external parts furthest from the cornice.

4. Fastening device according to claims 1, 2 or 3 characterized in that said flexible appendices comprise a first reinforced part nearer to the annular cornice having slots designed to receive corresponding side protuberances formed on said receptacles or electrical units and a second, weakened, part further from said cornice formed by a first thinning followed by a step forming a tooth which is in turn followed by an inclined plane and by a second thinning to allow engagement of said side protuberances present on said receptacles or electrical units to allow locking them once they have been fitted on said flexible appendices where said sequence of a first thinning followed by a step, by an inclined plane and by a second thinning allows release of said receptacles or electrical units by mere bending inward of said second thinning.

* * * * *